US010963234B2

(12) United States Patent
Armand et al.

(10) Patent No.: US 10,963,234 B2
(45) Date of Patent: *Mar. 30, 2021

(54) LOCATION-BASED AUTOMATIC SOFTWARE APPLICATION INSTALLATION

(71) Applicant: INTERNATIONAL BUSINESS MACHINES CORPORATION, Armonk, NY (US)

(72) Inventors: Cyril Armand, Montpellier (FR); Romain Buda, Saint-Paul-Et-Valmalle (FR); Julien Fleury, Montpellier (FR); Francois Varchon, Montpellier (FR)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/257,773

(22) Filed: Jan. 25, 2019

(65) Prior Publication Data

US 2019/0155589 A1 May 23, 2019

Related U.S. Application Data

(63) Continuation of application No. 15/481,985, filed on Apr. 7, 2017, now Pat. No. 10,216,506.

(51) Int. Cl.
*G06F 9/445* (2018.01)
*G06F 8/61* (2018.01)
(Continued)

(52) U.S. Cl.
CPC .......... *G06F 8/61* (2013.01); *H04W 4/02* (2013.01); *H04W 4/50* (2018.02); *H04W 4/60* (2018.02);
(Continued)

(58) Field of Classification Search
CPC ..... G06F 8/61–65; H04W 8/245; H04W 4/50; H04W 4/02; H04W 4/60
(Continued)

(56) References Cited

U.S. PATENT DOCUMENTS 5,559,520 A * 9/1996 Barzegar ............... G01S 5/0027
342/357.31
5,732,074 A * 3/1998 Spaur ..................... G07C 5/008
370/313
(Continued)

OTHER PUBLICATIONS

Schlöglhofer et al, "Secure and Usable Authentication on Mobile Devices", ACM , pp. 257-262 (Year: 2012).*
(Continued)

*Primary Examiner* — Anil Khatri
(74) *Attorney, Agent, or Firm* — Michael O'Keefe; Matthew M. Hulihan; Heslin Rothenberg Farley & Mesiti PC

(57) ABSTRACT

Installation of a location-based application. A method collects device data of a mobile device of a user, the device data including information indicative of a location at which the user will be present at a future time. The method identifies, based on the collecting the device data, a software application associated with that location. The method downloads an installer for the software application to the mobile device of the user. The method also automatically installs the software application on the mobile device based on a triggering event, the installing being prior to arrival of the user at the location at the future time.

20 Claims, 9 Drawing Sheets

(51) Int. Cl.
*H04W 4/02* (2018.01)
*H04W 4/60* (2018.01)
*H04W 4/50* (2018.01)
*H04W 8/24* (2009.01)
*H04W 4/029* (2018.01)
*H04L 29/08* (2006.01)
*H04W 84/12* (2009.01)

(52) U.S. Cl.
CPC ............ *H04W 8/245* (2013.01); *H04L 67/34* (2013.01); *H04W 4/029* (2018.02); *H04W 84/12* (2013.01)

(58) Field of Classification Search
USPC .................................................. 717/169–178
See application file for complete search history.

(56) References Cited

U.S. PATENT DOCUMENTS

| | | | |
|---|---|---|---|
| 6,391,708 B1* | 5/2002 | Liao | H01L 28/92 438/253 |
| 6,578,142 B1* | 6/2003 | Anderson | G06F 8/61 713/2 |
| 6,588,011 B1* | 7/2003 | Giammaria | G06F 8/61 714/E11.135 |
| 6,883,168 B1 | 4/2005 | James et al. | |
| 7,206,828 B1* | 4/2007 | Bourke-Dunphy | G06F 9/44505 709/221 |
| 7,343,601 B2* | 3/2008 | Azagury | G06F 8/61 707/999.202 |
| 7,581,217 B2* | 8/2009 | Jhanwar | G06F 8/65 717/168 |
| 7,647,633 B2* | 1/2010 | Edery | H04L 63/20 726/22 |
| 7,730,482 B2* | 6/2010 | Illowsky | G06F 9/4843 717/177 |
| 7,802,246 B1* | 9/2010 | Kennedy | G06F 8/61 717/173 |
| 7,979,856 B2 | 7/2011 | Murray et al. | |
| 8,060,074 B2* | 11/2011 | Danford | H04L 67/10 455/419 |
| 8,139,509 B2* | 3/2012 | Krivopaltsev | H04W 4/50 370/255 |
| 8,296,445 B1* | 10/2012 | Hackborn | G06F 11/3664 709/228 |
| 8,336,043 B2 | 12/2012 | Lavery et al. | |
| 8,347,283 B2 | 1/2013 | Stich | |
| 8,365,164 B1* | 1/2013 | Morgenstern | G06F 8/61 717/175 |
| 8,499,063 B1* | 7/2013 | Satish | G06F 11/3419 709/223 |
| 8,661,406 B2* | 2/2014 | Shapiro | G06F 8/30 717/106 |
| 8,752,042 B2* | 6/2014 | Ratica | G06F 9/505 717/174 |
| 8,762,578 B2* | 6/2014 | Van Gassel | G06F 16/275 709/248 |
| 8,819,659 B2* | 8/2014 | Ramer | G06F 16/2428 717/168 |
| 8,914,783 B2 | 12/2014 | Van Camp | |
| 8,930,940 B2 | 1/2015 | Xu et al. | |
| 9,021,452 B2 | 4/2015 | Kripalani | |
| 9,055,466 B2* | 6/2015 | Chandrayana | H04L 29/08072 |
| 9,125,000 B2* | 9/2015 | LaMarca | H04W 4/50 |
| 9,176,721 B2 | 11/2015 | Mann | |
| 9,411,572 B2* | 8/2016 | Luk | G06F 8/62 |
| 9,430,206 B2 | 8/2016 | Lin | |
| 9,529,500 B1 | 12/2016 | Gauci et al. | |
| 9,535,906 B2* | 1/2017 | Lee | G06F 3/017 |
| 9,544,396 B2* | 1/2017 | Richardson | H04W 4/60 |
| 9,690,644 B2 | 6/2017 | Anderson et al. | |
| 9,817,649 B2* | 11/2017 | D'Amico | G06F 8/61 |
| 10,129,211 B2* | 11/2018 | Heath | H04L 63/00 |
| 10,133,565 B2 | 11/2018 | Bastide et al. | |
| 10,216,506 B2* | 2/2019 | Armand | G06F 8/61 |
| 10,372,432 B2 | 8/2019 | Huang et al. | |
| 2003/0078036 A1* | 4/2003 | Chang | H04M 1/72525 455/419 |
| 2010/0146500 A1* | 6/2010 | Joubert | H04L 63/0838 717/178 |
| 2012/0042036 A1 | 2/2012 | Lau et al. | |
| 2012/0246630 A1* | 9/2012 | Kuzins | G06F 8/61 717/169 |
| 2013/0339345 A1 | 12/2013 | Soto Matamala et al. | |
| 2018/0032997 A1* | 2/2018 | Gordon | G06Q 30/0269 |
| 2018/0211282 A1* | 7/2018 | Gordon | G06Q 30/0262 |
| 2018/0293059 A1 | 10/2018 | Armand et al. | |

OTHER PUBLICATIONS

Khamis et al, "The Past, Present, and Future of Gaze-enabled Handheld Mobile Devices: Survey and Lessons Learned" ACM, pp. 1-17 (Year: 2018).*
Gudeth et al, "Delivering Secure Applications on Commercial Mobile Devices: The Case for Bare Metal Hypervisors", ACM, pp. 33-38 (Year: 2011).*
Bhamidipati et al, "A Large Scale Prediction Engine for App Install Clicks and Conversions", ACM, pp. 167-175 (Year: 2017).*
Lee et al, "Analysis of Application Installation Logs on Android Systems", ACM, pp. 2140-2145 (Year: 2019).*
Vasiu et al, "Mobile Agents in Wireless Devices", ACM, pp. 104-105 (Year: 2004).*
Hall et al, "A Cooperative Approach to Support Software Deployment Using the Software Dock", ACM, pp. 174-183 (Year: 1999).*
Petriu et al, "Analysing Software Requirements Specifications for Performance", ACM, 1-9 (Year: 2002).*
Heiner et al, "Secure Software Installation in a Mobile Environment", ACM, pp. 155-156 (Year: 2007).*
Chang et al, "Improving Structured Data Entry on Mobile Devices", ACM, pp. 75-84 (Year: 2013).*
Silva et al, "Streaming Sensor Data from Dynamically Reprogrammable Tasks Running on Mobile Devices", ACM, pp. 1-10 (Year: 2017).*
Willis et al, "ParaDrop: A Multi-tenant Platform to Dynamically Install Third Party Services On Wireless Gateways", ACM, pp. 43-48 (Year: 2014).*
Doa, Trinh Minh Tri, "Where and What: Using Smartphones to Predict Next Locations and Applications in Daily Life" [retrieved on Sep. 21, 2016]. Retrieved from Internet URL: <http://www.sciencedirect.com/science/article/pii/S1574119213000576>, 2 pgs.
Mell, Peter, et al., "The NIST Definition of Cloud Computing", NIST Special Publication 800-145, Sep. 2011, Gaithersburg, MD, 7 pgs.
Klokmose et al, "WiFi Proximity Detection in Mobile Web Applications" ACM, pp. 123-128, 2014.
Cappos et al, "Retaining Sandbox Containment Despite Bugs in Privileged Memory-Safe Code ", ACM, pp. 212-223, 2010.
Oren et al, "The Spy in the Sandbox: Practical Cache Attacks in JavaScript and their Implications", ACM, pp. 1406-1418, (Year: 2015).
Coker et al, "Evaluating the Flexibility of the Java Sandbox", ACM, pp. 1-10, 2015 (Year: 2015).
Vidas et al, "Evading Android Runtime Analysis via Sandbox Detection", ACM, pp. 447-458, 2014 (Year: 2014).
Bijlani et al, "A Lightweight and Fine-grained File System Sandboxing Framework", ACM, pp. 1-7, 2018 (Year: 2018).
Office Action in U.S. Appl. No. 15/481,985 dated May 17, 2018, 19 pgs.
Notice of Allowance in U.S. Appl. No. 15/481,985 dated Oct. 9, 2018, 13 pgs.
List of IBM Patents or Applications Treated as Related, Feb. 4, 2019, 2 pgs.

* cited by examiner

LOCATION-BASED AUTOMATIC SOFTWARE APPLICATION INSTALLATION

BACKGROUND

It is now common for various establishments, retail stores, museums, theaters, entertainment attractions, events, and others associated with a physical location to provide their own mobile application ("app") for patrons or other participants to download and install. Typically these companion apps serve to engage patrons, provide resources to them, and/or supplement their experience with or at the establishment. For instance, an event app might provide a list of event vendors and details about the schedule of event activities. However, users may not have prior knowledge that such an app exists, let alone make the effort to visit an appropriate app store, search for and identify the proper app, download the app ahead of time when an appropriate or preferred network connection is available, and install the app.

SUMMARY

Shortcomings of the prior art are overcome and additional advantages are provided through the provision of a computer-implemented method. The method collects device data of a mobile device of a user, the device data including information indicative of a location at which the user will be present at a future time. The method identifies, based on the collecting the device data, a software application associated with that location. The method downloads an installer for the software application to the mobile device of the user. The method also automatically installs the software application on the mobile device based on a triggering event, the installing being prior to arrival of the user at the location at the future time.

Further, a computer program product including a computer readable storage medium readable by a processor and storing instructions for execution by the processor is provided for performing a method. The method collects device data of a mobile device of a user, the device data including information indicative of a location at which the user will be present at a future time. The method identifies, based on the collecting the device data, a software application associated with that location. The method downloads an installer for the software application to the mobile device of the user. The method also automatically installs the software application on the mobile device based on a triggering event, the installing being prior to arrival of the user at the location at the future time.

Yet further, a computer system is provided that includes a memory and a processor in communications with the memory, wherein the computer system is configured to perform a method. The method collects device data of a mobile device of a user, the device data including information indicative of a location at which the user will be present at a future time. The method identifies, based on the collecting the device data, a software application associated with that location. The method downloads an installer for the software application to the mobile device of the user. The method also automatically installs the software application on the mobile device based on a triggering event, the installing being prior to arrival of the user at the location at the future time.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
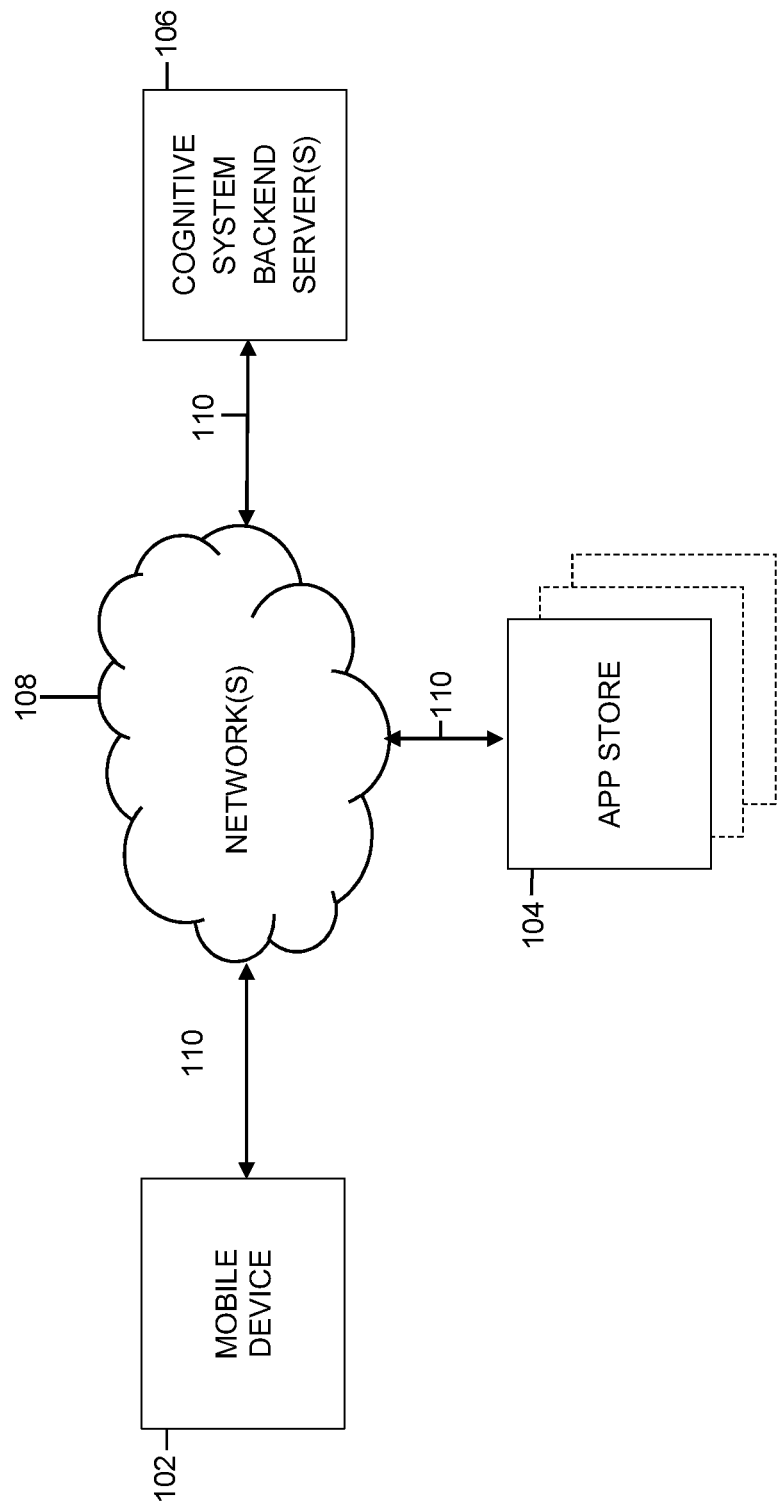
FIG. 1 depicts an example environment to incorporate and/or use aspects described herein.

Aspects described herein include facilities for seamlessly installing applications associated with locations at which users are predicted to be at a future time, based on cognitive analysis of device data of the user. Using a cognitive system, an understanding is ascertained about where a user desires or is expected to be at a future time. As examples, the user might plan to visit a particular retailer, attraction, event, meeting, or other entity or occurrence at a physical location. There may be one or more mobile software applications ("apps") about, associated with, or related to the location, for instance a building or venue at that location. These app(s) might supplemental, compliment, enhance, assist, aid, or otherwise be associated with the user's presence at that location at the future time. Such apps may be available for installation on a mobile device of the user, for instance a smartphone, tablet, or other mobile/portable computer system of the user. The system may anticipate that the user will engage with the app when at the location at the future time. Some time, e.g. a few days, before the app is needed or requested in that regard when the user is at the location, the system can download it using a preferred network, for instance a Wi-Fi network that is fixed cost for virtually unlimited downloading, as opposed to another type of network connection, e.g. one that may be variable cost, such as a cellular connection. By downloading the app is meant retrieving the app or program code thereof, or, more typically, retrieving an installer containing the app/program code and that installs the app. Consequently, if the user goes to the physical location at the future time, the installer can install the app ahead of time so it is available on-demand. This is the case regardless of whether there is an available network at that location, because the application code was previously downloaded.

The installation may therefore be performed on-demand and when needed or requested, for instance based on timing of the user's arrival at the location at which the user is predicted to be at some future time.

In some embodiments, the application is installed in a secured sandbox application that is also installed on the mobile device. The sandbox application can request device rights/permissions when installed and prevent device rights contention. It can provide a platform to pre-authorize the installation and proper device permissions of downloaded applications. In addition, it can be used as the platform on which the download apps are installed in the background, for instance without or absent prompting the user to explicitly install the software or directly authorize its installation.

In this manner, the application can be installed and ready to use when the user arrives at the location. The app is available without the user having to separately download and install the application, as that download/install may not be possible otherwise due to, e.g., lack of a network connection to retrieve the installer.

Aspects can also help companies or other establishments increase a number of downloads of their app. If there is no network available at the location or the network connection is spotty, unreliable, or unavailable to many users, the company can provide an indication to a cognitive system that the app is to be pre-downloaded, i.e. before the user travels to the relevant location, such as the location of the company's store, attraction, other building, or event, as examples.

Accordingly, described herein are facilities to predict or anticipate, using a cognitive system, that an app is to be downloaded and installed and/or is associated with a location at which a user will be present at a future time. The prediction may be based on and use data provided by the user's mobile device, for instance messaging (SMS, MMS, etc.) data, social network data, email data, calendar data, and so on. The data may be part of application data of respective applications, such as messaging, social network, email, and/or calendar applications. The data may be used to identify a proper application to download according to what is indicated by that data, e.g. what the user has planned to do and/or where the user had planned to go. The cognitive system can download the app before the user arrives at the location, and this may be done using a preferred network or network connection type, for example a Wi-Fi network connection to quickly download the app while minimizing data costs. When the user arrives, the app may already be installed and ready to be securely launched in the sandbox.

FIG. 1 depicts an example environment to incorporate and/or use aspects described herein, such as an environment in which a cognitive system is leveraged in the identification of apps to download and install. Mobile device 102 is a smartphone, tablet, wearable mobile device, or other portable computer system of a user.

App store(s) 104 are online repositories for software apps, from which client devices download apps, typically in the form of application installer packages, for installation on the client devices. Example app stores include the APP STORE® offered by Apple Inc., Cupertino, Calif., U.S.A. (of which APP STORE is a registered trademark) and GOOGLE PLAY offered by Google Inc., Mountain View, Calif., U.S.A. (of which GOOGLE PLAY is a trademark).

Cognitive system backend server(s) 106 are computer systems that provide a backend to a cognitive system described herein that is part of a sandbox application that is installed on the user's mobile device. The cognitive system backend provides a robust cognitive processing and analysis engine that sits remote from mobile devices. The mobile device 102 can reach out to the cognitive system backend 106 via application programming interface (API) calls or other requests. Example cognitive system backends are the IBM WATSON® line of offerings from International Business Machines Corporation, Armonk, N.Y., U.S.A. (of which IBM WATSON is a registered trademark). Thus, in some examples, this backed is provided as a cloud service hosted on a cloud platform.

Mobile device 102, app store(s) 104, and cognitive system backed 106 are in communication with, and communicate via, one or more intervening networks 108 over wired and/or wireless communications links 110, such as wired and/or cellular, Wi-Fi, or other types of wireless connections. More generally, communications links 110 may be any appropriate wireless and/or wired communication link(s) for communicating data.

Figure 2:
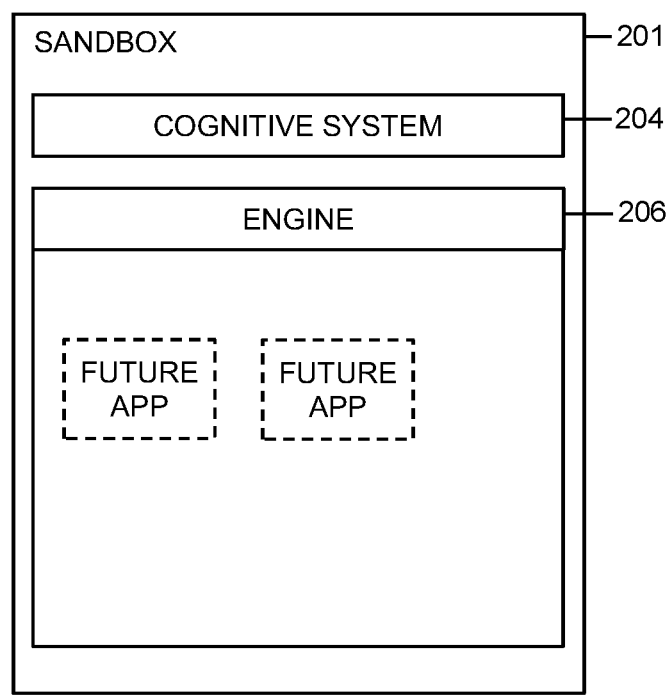
FIG. 2 depicts an example conceptual diagram of a sandbox application, in accordance with aspects described herein.

Aspects described herein encompass a sandbox application to be installed on the mobile device of the user. The sandbox application is described with reference to a cognitive system portion and an engine portion. FIG. 2 depicts an example conceptual diagram of a sandbox application 201, in accordance with aspects described herein. The mobile device has installed thereon the sandbox app 201, which contains the cognitive system 204. The sandbox app may be pre-packaged/pre-installed with the mobile device by the manufacturer or other provider of the device, or the user may install the sandbox app from an app store, as examples.

By default, the sandbox 201 can be configured to request and receive (from the mobile device, e.g. the operating system thereof) access or permissions to use a set of native functions or other facilities of the device (e.g. location, camera, sensors, SMS, apps, etc.). In other words, permissions managed by a device permissions scheme typical of mobile operating systems can be given to the sandbox app. In some examples, the actual permissions given to the sandbox may be configurable by a user. The user could, for instance, deny permissions for the sandbox app to use the camera(s) of the mobile device.

The cognitive system portion 204 of sandbox application 201 is used in the identification of an appropriate application to download and install. The engine portion 206 is used to manage the downloaded applications.

The cognitive system portion 204 can be linked to the user's device data, for instance can monitor, harvest, or collect all or some data provided on/by the user's device (e.g. SMS and other types of messages, social networks, email, calendar, etc.) and select relevant data in order to identify the app to download. The analysis of the device data is in some examples to understand where the user will be going at a future time. From that, it can be detected whether an app associated with the location is available. This association is, in some examples, the fact that the application is a mobile app for a business or event at that location. By way of specific example, the event may be a concert festival and the app is an app provided by the festival organizers for patrons of the festival.

Figure 3A:
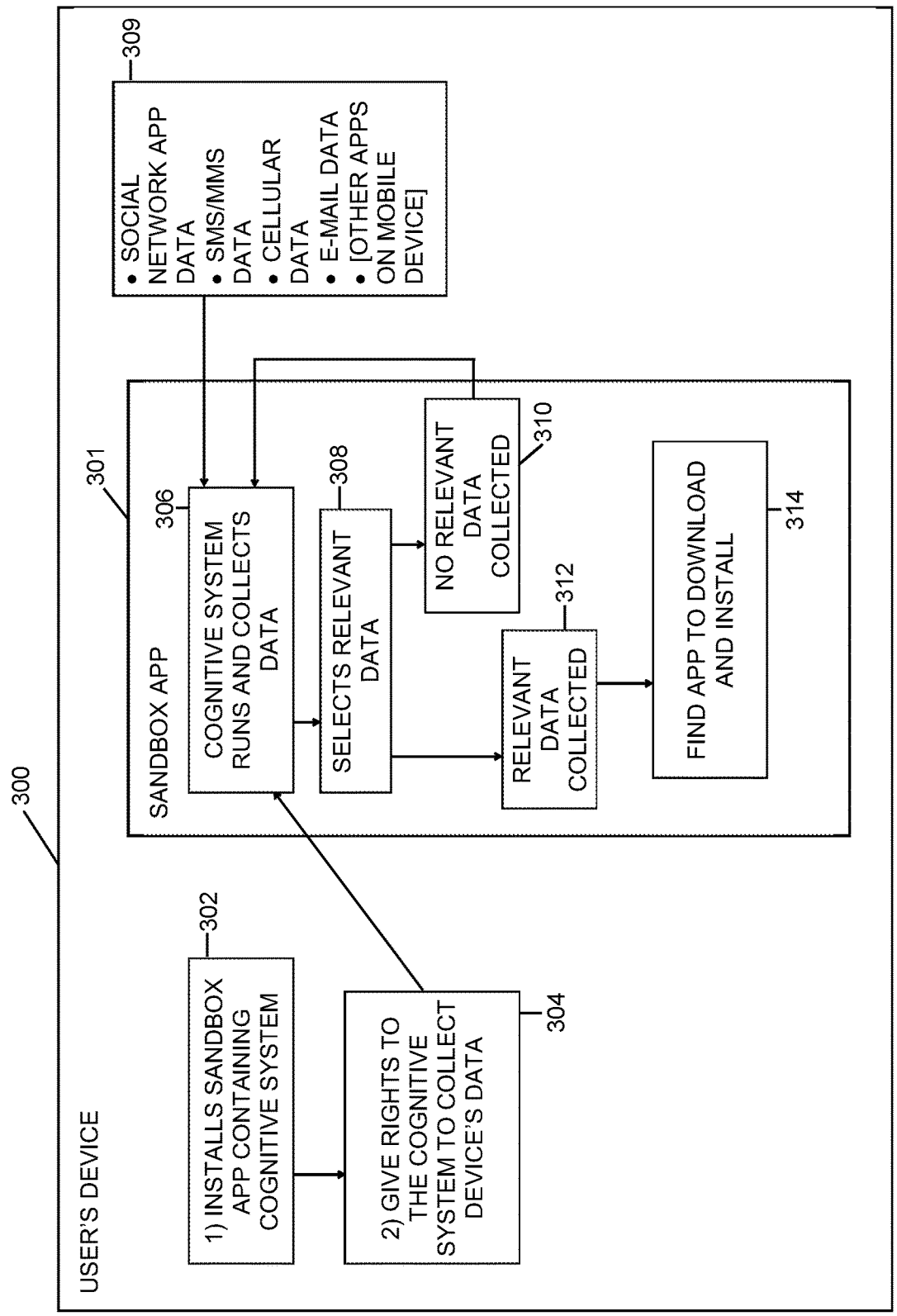
FIG. 3A depicts example processing for cognitively identifying a software application in accordance with aspects described herein.

FIG. 3A depicts example processing for cognitively identifying a software application in accordance with aspects described herein. In some examples, aspects of FIG. 3A are performed by a sandbox application. On the user's mobile device 300, the user (or manufacturer of the device) installs the sandbox app 301 containing the cognitive system (302). Then the system gives rights to the cognitive system of the sandbox to collect device data (304). Once the cognitive system is ready insofar as the rights to collect device data, processing of the sandbox application 301, for instance cognitive system thereof which may run as a background process, runs and collects (306) device data 309. The device data 309 can come from one or more sources, which may be application data stores and/or sensor data as examples. Example device data 309 includes social network app data, SMS/MMS data, cellular data, email data, and/or any other data from apps on the mobile device. The processing of the sandbox, for example the cognitive system thereof, selects relevant data (308), for instance data indicating a planned event, visit or presence in a particular location for which an associated app is available, if such relevant data exists. If no relevant data has been collected (310), the process returns to 306 to collect more as time passes. Otherwise, if relevant data was collected (312), the process finds an app to download and install (314). Some aspects of the cognitive system may be supported and/or performed by, or leveraging, a remote cognitive analysis engine. In particular examples, some or all collected device data is sent to the remote cognitive analysis engine for analysis, the engine identifies the relevant data that indicates a future time/location, and the engine returns an indication of an app to download or install. Alternatively, the cognitive system of the installed sandbox may sift through collected data and provide only the relevant data to the remote engine to identify the app to download and install. As yet another alternative, the sandbox may perform a majority of the parsing of the data to identify key words or other key indicators of an app, and may reach out to the remote engine to comb app stores for applicable associated apps. In this regard, aspects of the cognitive analysis and process are in some examples distributed between the sandbox app of a mobile device and one or more backend servers.

In some examples, the mobile device, by way of the cognitive system of the sandbox, makes API calls to a third-party-provided remote engine for the analytics to identify (i) relevant data from the collected data, and/or (ii) the app to download. In this regard, the cognitive system of the sandbox can use authorized data from a user and/or the device to make API calls to a cognitive engine that collects relevant data (dates, locations, etc.) and attempts to match that information with information from app store(s).

By way of specific example, as an initial step, relevant data is collected from a user (possibly by prompting the user to provide information) and/or device data. For instance, assume there is a SMS message from a first user to a second user saying, "Hey, remember that we will be going to the Cambridge Jazz Festival on November $16^{th}$." A "Natural Language Classifier" offering on the Watson Developer Cloud provided by International Business Machines Corporation, Armonk, N.Y., U.S.A. might identify that there are three pieces of key information in a single context: a date (November 16), event (Jazz festival), and location (Cambridge), all in a single message. The classifier, invoked via an API, might associate each parsed phrase of the message (Cambridge, Jazz festival, November 16) to its respective type of information (Location, Event, Date). Together with the fact that a current date is in mid-October, the system might conclude that the users are planning to both attend the upcoming Cambridge Jazz Festival.

The system can use the data to detect an upcoming event or other planned user presence at a given location, find an associated app, and plan the download of the app. The cognitive system (again possibly via invoking appropriate APIs provided by a remote cognitive analysis engine/backend) could determine that the upcoming event is on November 16th and the user will attend that event at the event location, and analyze this together with the current date of October 19th to plan a timeframe for downloading the app prior to the event time, e.g. open the download window starting November 10th, with a deadline to download being on the day of the event (November 16th). The system can also look for candidate associated applications in available app store(s) and leverage the remote engine to compare these matches against the relevant device data to identify the best match. If two app results returned were a 'Cambridge Jazz Festival 2017' app and a 'Cambridge Rock Festival 2018' app, the remote system may determine that the first result is the proper application to download. In some embodiments, this is can be based on a 'retrieve and rank' API offering to retrieve results/hits from one or more app stores and rank those results. The API offering could, for instance, take as input user or device data and application store information, then compare these two sets of information to identify a match. The output may be a sorted list of applications ranked by relevance (matching score). The list may be sorted with a knowledge database (e.g. machine learning model).

Based on the output, the system may trigger a download of the application with the highest rank and optionally a rank that scores superior to a defined threshold. In cases where the system is not sufficiently confident in any particular app or as between two or more apps, the system could prompt the user for a confirmation/selection of the relevant app to download, or could refrain from prompting and instead return to 306 (FIG. 3A) to collect more data.

The cognitive system can undergo a learning process. The utilization rate of downloaded applications by the user (or an aggregate of users) can provide valuable feedback. This feedback can fuel a knowledge base, which may be used in the sorting of a list of search results when searching for applications, using known machine learning techniques such as neural networks and/or deep learning. As an example, if the user has never used any 'festival' application, the cognitive system may score lower any future 'festival' application results. Conversely, if the user relatively frequently uses 'museum' applications, the cognitive system could promote any future applications of that type to be downloaded when the user or device data indicates a possibility of a future visit to a museum, e.g. (proximity to a museum as determined based on collected GPS data from the device, social media publication of a future travel near a museum, etc.).

Some time before the user arrives at the location at the future time, the system can download the app following a prioritization of network connection type to use in downloading the app. The prioritization can emphasize lower cost and faster networks (e.g. Wi-Fi) relative to higher cost and slower networks (e.g. cellular/LTE/GSM). The most preferred network connection may be a costless' network, for instance a Wi-Fi network connection to the internet. In this regard, the system may put off downloading the application for some time, awaiting connection of the device to a Wi-Fi or other preferred network. The system could wait any configurable period of time including waiting until within some timeframe just before the future time of the user's presence at the location. For instance, the download may be delayed to within a configurable timeframe, where if the device connects to a preferred network before that timeframe, the app is downloaded. If the device has not connected to the preferred network until the day of the event (or some other configurable timeframe), the cognitive system could leverage a next highest priority network (for instance LTE) and/or prompt the user about whether/when the system should download the app using an alternative network.

Figure 3B:
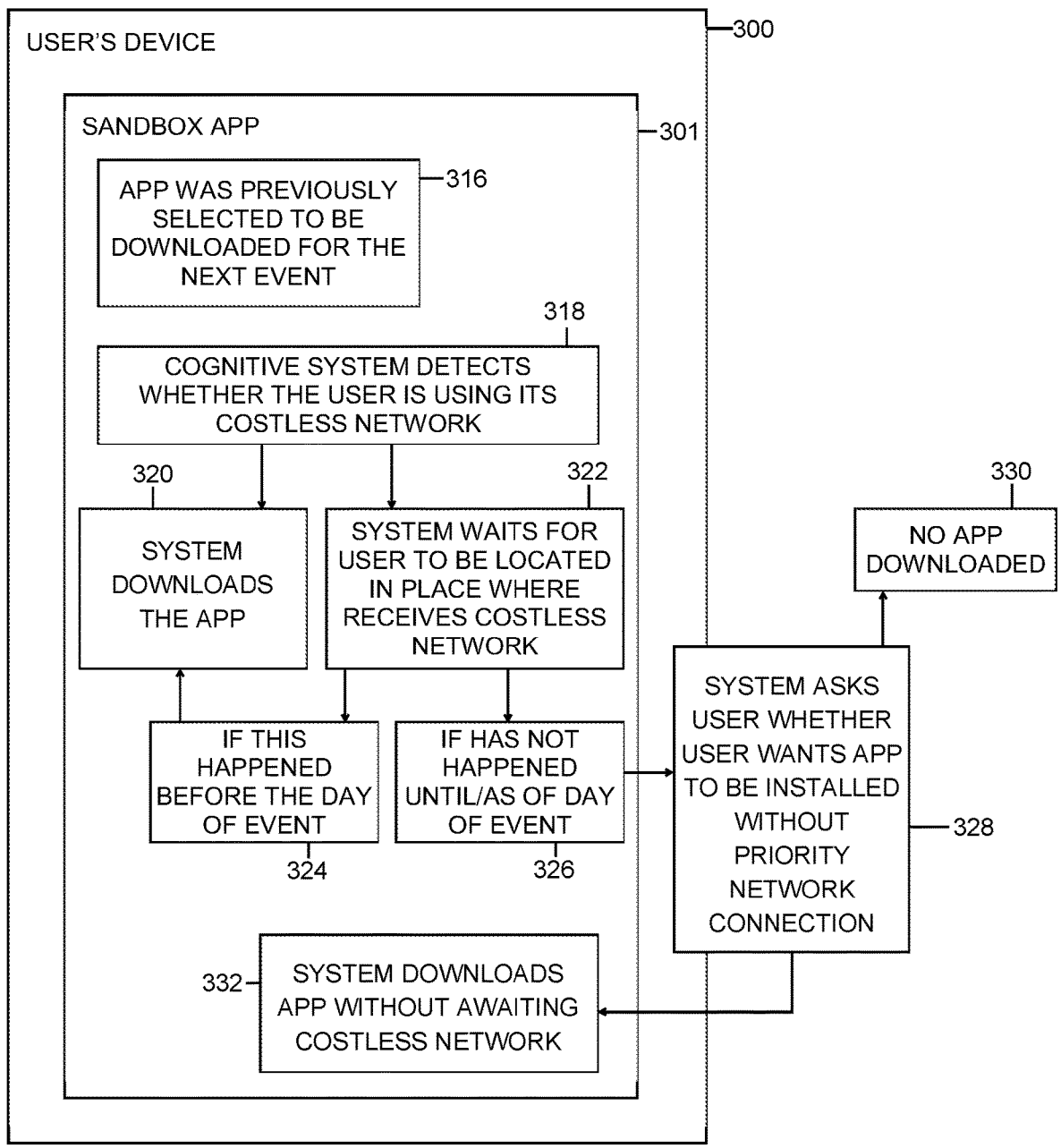
FIG. 3B depicts example processing for downloading a software application in accordance with aspects described herein.

FIG. 3B depicts example processing for downloading a software application in accordance with aspects described herein. In some examples, aspects of FIG. 3B are performed by a sandbox application. Initially, the app to download was previously (see FIG. 3A #314) selected to be downloaded for (in this example) a next event (316). The cognitive system of the sandbox detects whether the user is using a costless' network (318), i.e. whether the mobile device is connected to a preferred or prioritized network connection. If so, then the system downloads the app (320), which may or may not be with user interaction/confirmation. Otherwise, if the mobile device is not connected to a preferred or prioritized network connection, the system can wait for the user (and by proxy the mobile device) to be located in a place where the device receives a 'costless' network connection (322). The process may proceed differently depending on whether and when such a connection is made. In this example, if this connection is made before the day of the event (324), then the system downloads the app (320). If the connection has not happened as of the day of the event (326), then the system asks the user whether the user wants the app to be downloaded/installed without the priority network connection (328). If the user indicates 'No', then the app is not downloaded (330). Otherwise, if 'Yes', the system downloads the app without further awaiting a costless' network connection (332). The system can place the downloaded app in the sandbox engine (FIG. 2, #206), for instance as a security measure.

Once downloaded, the system can install the app at a desired time, for instance before or when the user arrives at the location. The installation of the downloaded application may therefore be triggered in some examples based on geolocation. Other triggers are possible, for instance time-based triggers.

The app is installed on the mobile device, and in some examples is installed within the sandbox, for security, permissions, and any other desired reasons. The installation may proceed in the background, i.e. without alerting the user unless permissions are needed. Each new app may be installed in its own respective environment within the sandbox, for instance as/in a container, virtual machine, or other entity. This could allow users to manage access rights for downloaded apps directly through the sandbox. As discussed previously, the rights given to a particular installed application may be acquired by way of the permissions given to the sandbox app. For instance, the sandbox app, when installed, may request access to the user's contacts and SMS messages of the mobile device, and those permissions may be passed to downloaded and installed apps, if they request those permissions. The security of new applications installed by the cognitive system may be less of a concern because those apps are installed in the sandbox environment.

Figure 3C:
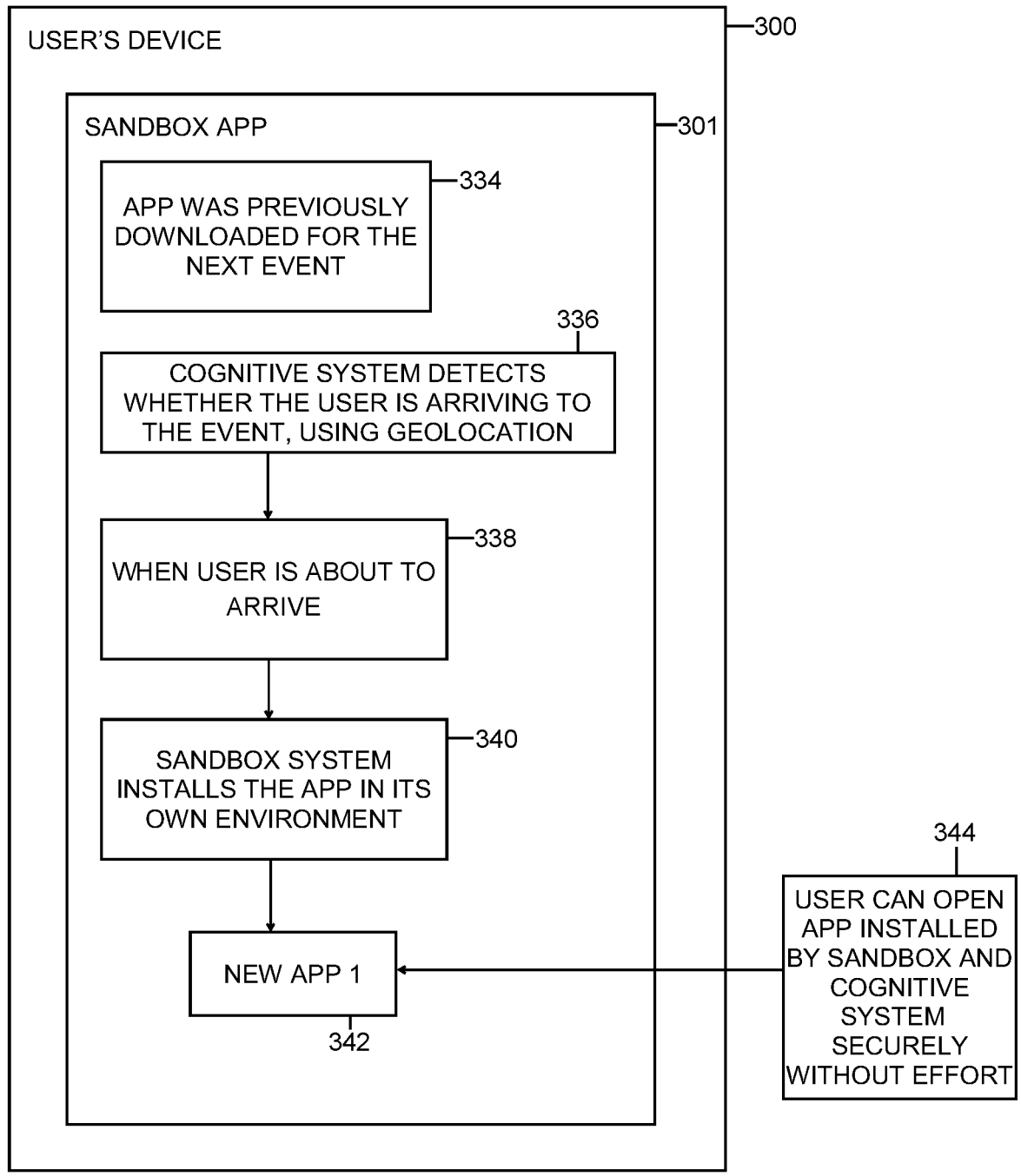
FIG. 3C depicts example processing for installing a software application in accordance with aspects described herein.

FIG. 3C depicts example processing for installing a software application in accordance with aspects described herein. In some examples, aspects of FIG. 3C are performed by a sandbox application. The app was previously downloaded for a next event or other occasion (334) to be held at a location at which the user will be present at a future time. The installation of the app is triggered by some triggering event. The triggering event may be time-based or location-based, as examples. For instance, the triggering event may be a configurable threshold of time before the future time, for instance 24 hours before the user is expected to be present at the location. In another example, it is time-based in that the trigger is a configurable amount of time (for instance 10 minutes) before the arrival of the user at the location. This may be based in part on location of the user, where the system detects that the user is traveling to the location, and the trigger is set based on detecting the user's movement toward the location. Alternatively, the location-based triggering may detect when the user is within some configurable distance, for instance 200 meters, from the location. Upon the user entering this configurable radius from the location, the system triggers installation of the downloaded application.

In the particular example of FIG. 3C, the cognitive system uses geolocation of the mobile device to detect whether the user is arriving at the event (336). When the user is about to arrive (for instance is within some distance, like 200 meters, of the location and/or has an estimated time of arrival to the location within some configurable timeframe) (338), then the sandbox installs the app in the app's own environment (340). This provides new app 1 (342) as an installed application on the mobile device. The user can open the application installed by the sandbox and cognitive system securely without additional steps or efforts (344).

Accordingly, aspects are performed by the cognitive system and sandbox potentially absent or without any user interaction. The system can collect and parse the mobile device data to ascertain a useful app related to the user's presence at a future time at an associated location. The app may be seamlessly downloaded when appropriate and installed prior to the user's demand for the application when at the location at the proper time. The user is able to open the newly installed app running in the sandbox environment. It makes no difference in terms of app download and installation whether there is a network connection available at that location at the time the user is present, because the app has already been downloaded and installed.

Aspects described herein differ from other approaches, for instance ones that provide a Quick Response (QR) or other code to facilitate download of an application. In accordance with aspects described herein, the device's data may be used to predict where the user has planned to go, the associated application may be downloaded and installed proactively, and when the user arrives at the location, the app has already been downloaded and installed. The location itself need not provide any app information to facilitate the download, as the user's device may be any arbitrary distance from the location at the time the prediction is made and the app to be downloaded is identified. Since the application is downloaded before arriving at the location, preferred network connections (e.g. home Wi-Fi over GSM/LTE networks) can be utilized and/or potential network issues depending on the location are avoided. Furthermore, the application may be installed in a sandbox, allowing secure download and installation of the application in a contained environment.

Figure 4:
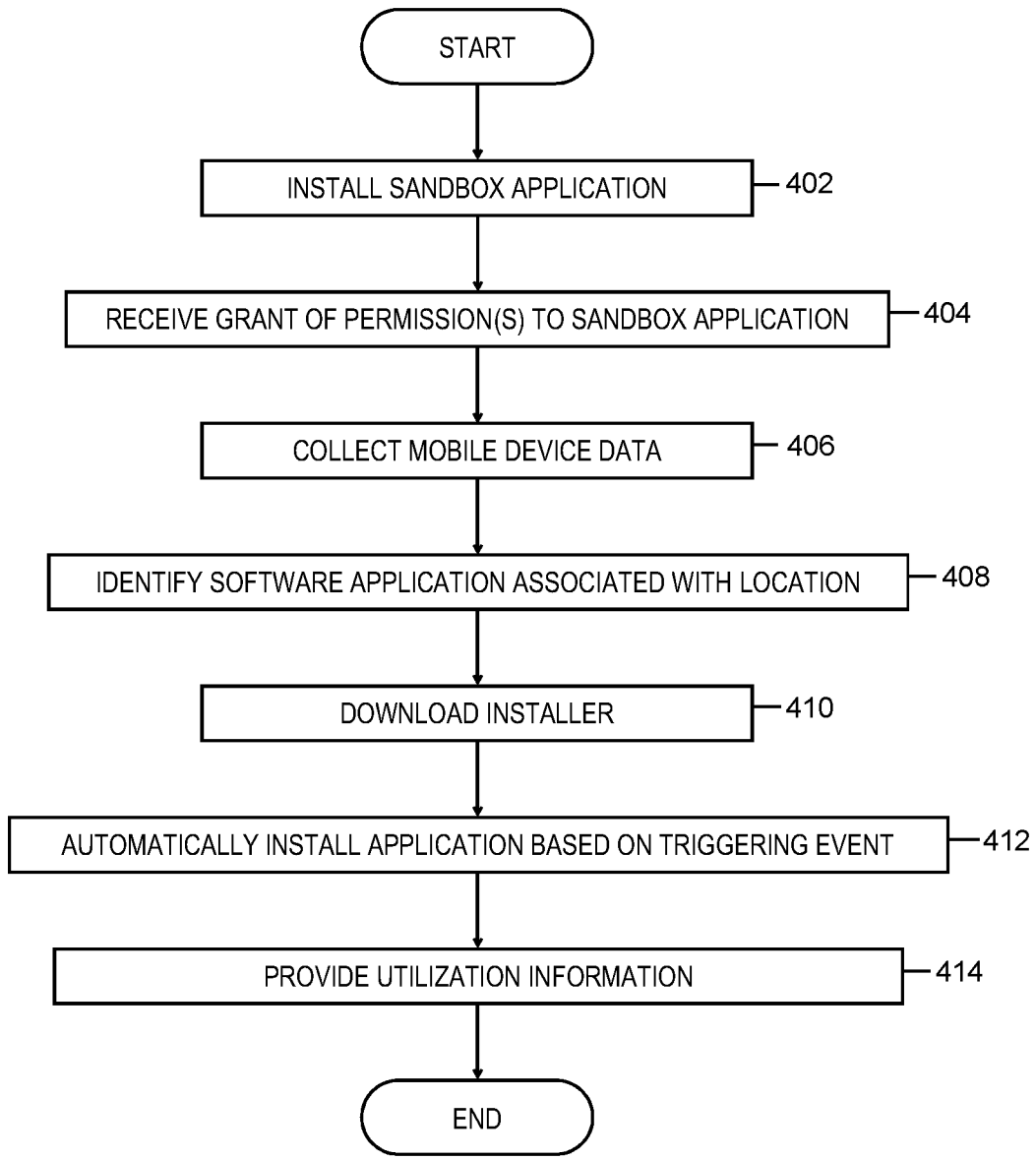
FIG. 4 depicts an example process for installation of a location-based application, in accordance with aspects described herein.

FIG. 4 depicts an example process for installation of a location-based application, in accordance with aspects described herein. In some examples, the process is performed by one or more computer systems, such as those described herein, which may include one or more mobile devices, one or more cognitive system backend server(s), one of more other computer systems, and/or a combination of the foregoing.

The process begins by initially installing a sandbox application on a mobile device of a user (402). The sandbox may be downloaded and installed by the user or pre-installed by the device manufacturer, cellular provider, or other middleman in the supply chain. The process receives from the user a grant of one or more application permissions to the sandbox application (404). The application permission may be permissions to leverage, access, or utilize hardware or software facilities of the mobile device. These application permission(s) granted to the sandbox may later serve as permission(s) given to an installed sandboxed application.

The process proceeds by collecting device data of the mobile device (406). The device data can include information indicative of a location at which the user will be present at a future time. In some examples, this device data includes application data of at least one application installed on the mobile device of the user, the at least one application including a messaging application, a social network application, an email application, and/or a calendar application of the mobile device.

The process then identifies, based on collecting the device data, a software application associated with that location (408). The software application can include a mobile app for a business at the location or a mobile app for an event to be held at the location, as examples.

The identifying of the app can include providing the collected device data to a remote cognitive analysis engine, for instance via API calls over the internet or other network(s), then invoking the remote cognitive analysis engine to cognitively analyze the device data. The mobile device can receive from the remote cognitive analysis engine an identification of the software application based on a correlation between date or location information indicated by the device data and software application information from at least one mobile application store. In this regard, the remote cognitive analysis engine can comb app store(s) to build an inventory of their offerings characteristics of the apps offered. Some apps may provide resources that users at that location may utilize, and therefore the identifying of the app can identify the software application as being a resource that the user is expected to use at that location at the future time.

The process downloads an installer for the software application to the mobile device of the user (410), which may follow a prioritization of network connection type to use in downloading the installer. The prioritization can emphasize lower cost and faster networks relative to higher cost and slower networks. In this regard, the downloading can include initially delaying the downloading of the installer and awaiting connection of the mobile device to a preferred or prioritized network, such as Wi-Fi network which may be costless (free to use) or relatively inexpensive (compared to other networks like cellular networks). Based on delaying the downloading of the installer to within a configurable timeframe of the future time (for instance the morning of the future time) and based on continuing to await connection of the mobile device to the Wi-Fi network, i.e. the mobile still has not connected since the download was queued, the downloading can at that point leverage a next, e.g. lower priority, network connection type, other than a Wi-Fi network, to attempt the download. In some examples, the mobile device prompts the user whether to download the app using the non-preferred/prioritized network connection.

Once the process downloads the installed, the process can at some point automatically install the software application on the mobile device (412), which may be based on a triggering event. The installing can be prior to arrival of the user at the location at the future time. The triggering event includes in some examples detecting that the mobile device is within a configurable distance (e.g. 200 meters) from the location. Additionally or alternatively, the triggering event includes determining that the mobile device is expected to arrive at the location within a configurable timeframe (e.g. 2 minutes).

As part of the automatic installation (412), the process can automatically authorize, during that automatic installation, at least one application permission required for the software application, and that automatic authorization may be based on the received grant of the one or more application permissions to the sandbox (402). In this manner, the automatic installation of the software application could complete on the mobile device absent or without any additional user-input to grant the at least one application permission.

Continuing with FIG. 4, the process occasionally provides to the remote cognitive analysis engine utilization information about user engagement with the software application, post-installation (414). This may be to facilitate training the remote cognitive analysis system to identify useful applications for one or more users. For instance, profiles for the individual user and/or more generally-applicable profiles may be built that inform the engine about actual application utilization, to help tune the engine's accuracy and identifying applications associated with given user data. This can improve the quality of future application identifications.

Although various examples are provided, variations are possible without departing from a spirit of the claimed aspects.

Figure 5:
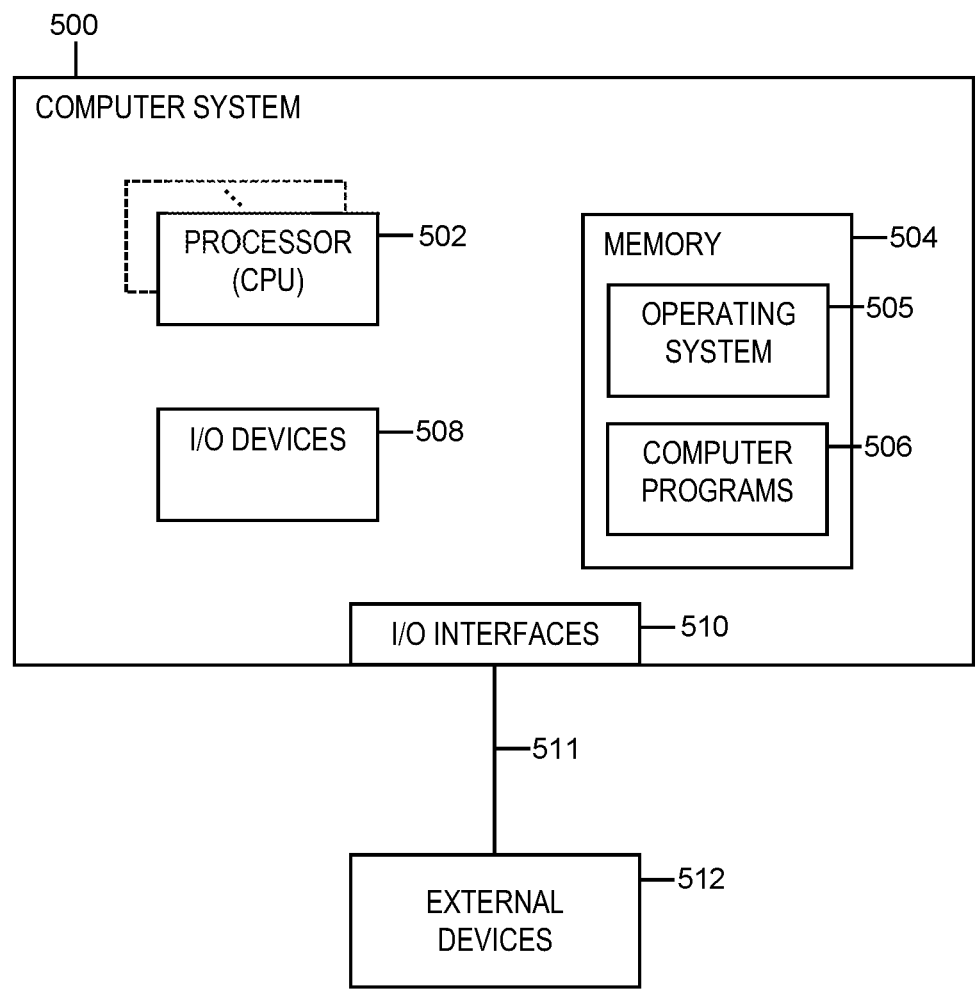
FIG. 5 depicts one example of a computer system and associated devices to incorporate and/or use aspects described herein.

Processes described herein may be performed singly or collectively by one or more computer systems, such as one or more mobile devices, cognitive system backing server(s), or a combination of the foregoing, as examples. FIG. 5 depicts one example of such a computer system and associated devices to incorporate and/or use aspects described herein. A computer system may also be referred to herein as a data processing device/system, computing device/system/node, or simply a computer. The computer system may be based on one or more of various system architectures and/or instruction set architectures, such as those offered by International Business Machines Corporation (Armonk, N.Y., USA), Intel Corporation (Santa Clara, Calif., USA) or ARM Holdings plc (Cambridge, England, United Kingdom), as examples.

FIG. 5 shows a computer system 500 in communication with external device(s) 512. Computer system 500 includes one or more processor(s) 502, for instance central processing unit(s) (CPUs). A processor can include functional components used in the execution of instructions, such as functional components to fetch program instructions from locations such as cache or main memory, decode program instructions, and execute program instructions, access memory for instruction execution, and write results of the executed instructions. A processor 502 can also include register(s) to be used by one or more of the functional components. Computer system 500 also includes memory 504, input/output (I/O) devices 508, and I/O interfaces 510, which may be coupled to processor(s) 502 and each other via one or more buses and/or other connections. Bus connections represent one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 504 can be or include main or system memory (e.g. Random Access Memory) used in the execution of program instructions, storage device(s) such as hard drive(s), flash media, or optical media as examples, and/or cache memory, as examples. Memory 504 can include, for instance, a cache, such as a shared cache, which may be coupled to local caches (examples include L1 cache, L2 cache, etc.) of processor(s) 502. Additionally, memory 504 may be or include at least one computer program product having a set (e.g., at least one) of program modules, instructions, code or the like that is/are configured to carry out functions of embodiments described herein when executed by one or more processors.

Memory 504 can store an operating system 505 and other computer programs 506, such as one or more computer programs/applications that execute to perform aspects described herein. Specifically, programs/applications can include computer readable program instructions that may be configured to carry out functions of embodiments of aspects described herein.

Examples of I/O devices 508 include but are not limited to microphones, speakers, Global Positioning System (GPS) devices, cameras, lights, accelerometers, gyroscopes, magnetometers, sensor devices configured to sense light, proximity, heart rate, body and/or ambient temperature, blood pressure, and/or skin resistance, and activity monitors. An I/O device may be incorporated into the computer system as shown, though in some embodiments an I/O device may be regarded as an external device (512) coupled to the computer system through one or more I/O interfaces 510.

Computer system 500 may communicate with one or more external devices 512 via one or more I/O interfaces 510. Example external devices include a keyboard, a pointing device, a display, and/or any other devices that enable a user to interact with computer system 500. Other example external devices include any device that enables computer system 500 to communicate with one or more other computing systems or peripheral devices such as a printer. A network interface/adapter is an example I/O interface that enables computer system 500 to communicate with one or more networks, such as a local area network (LAN), a general wide area network (WAN), and/or a public network (e.g., the Internet), providing communication with other computing devices or systems, storage devices, or the like. Ethernet-based (such as Wi-Fi) interfaces and Bluetooth® adapters are just examples of the currently available types of network adapters used in computer systems (BLUETOOTH is a registered trademark of Bluetooth SIG, Inc., Kirkland, Wash., U.S.A.).

The communication between I/O interfaces 510 and external devices 512 can occur across wired and/or wireless communications link(s) 511, such as Ethernet-based wired or wireless connections. Example wireless connections include cellular, Wi-Fi, Bluetooth®, proximity-based, near-field, or other types of wireless connections. More generally, communications link(s) 511 may be any appropriate wireless and/or wired communication link(s) for communicating data.

Particular external device(s) 512 may include one or more data storage devices, which may store one or more programs, one or more computer readable program instructions, and/or data, etc. Computer system 500 may include and/or be coupled to and in communication with (e.g. as an external device of the computer system) removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media.

Computer system 500 may be operational with numerous other general purpose or special purpose computing system environments or configurations. Computer system 500 may take any of various forms, well-known examples of which include, but are not limited to, personal computer (PC) system(s), server computer system(s), such as messaging server(s), thin client(s), thick client(s), workstation(s), laptop(s), handheld device(s), mobile device(s)/computer(s) such as smartphone(s), tablet(s), and wearable device(s), multiprocessor system(s), microprocessor-based system(s), telephony device(s), network appliance(s) (such as edge appliance(s)), virtualization device(s), storage controller(s), set top box(es), programmable consumer electronic(s), network PC(s), minicomputer system(s), mainframe computer system(s), and distributed cloud computing environment(s) that include any of the above systems or devices, and the like.

Aspects described herein may be incorporated into and/or use a cloud computing environment. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes. One such node is node 10 depicted in FIG. 6.

Computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

Figure 6:
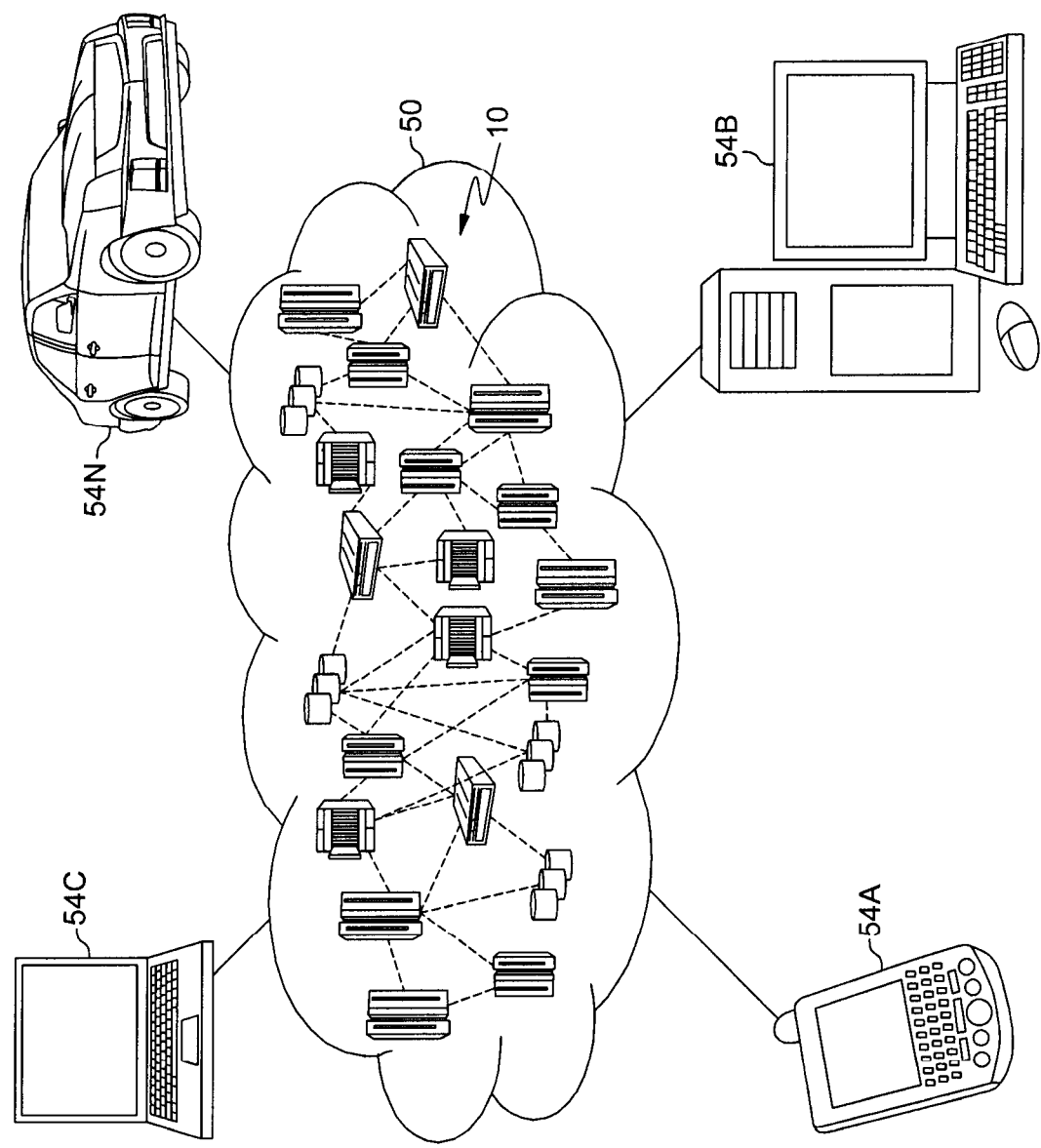
FIG. 6 depicts a cloud computing environment according to an embodiment of the present invention.

Referring now to FIG. 6, illustrative cloud computing environment 50 is depicted. As shown, cloud computing environment 50 comprises one or more computing nodes 10 with which local computing devices used by cloud consumers, such as, for example, smartphone or other mobile device 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
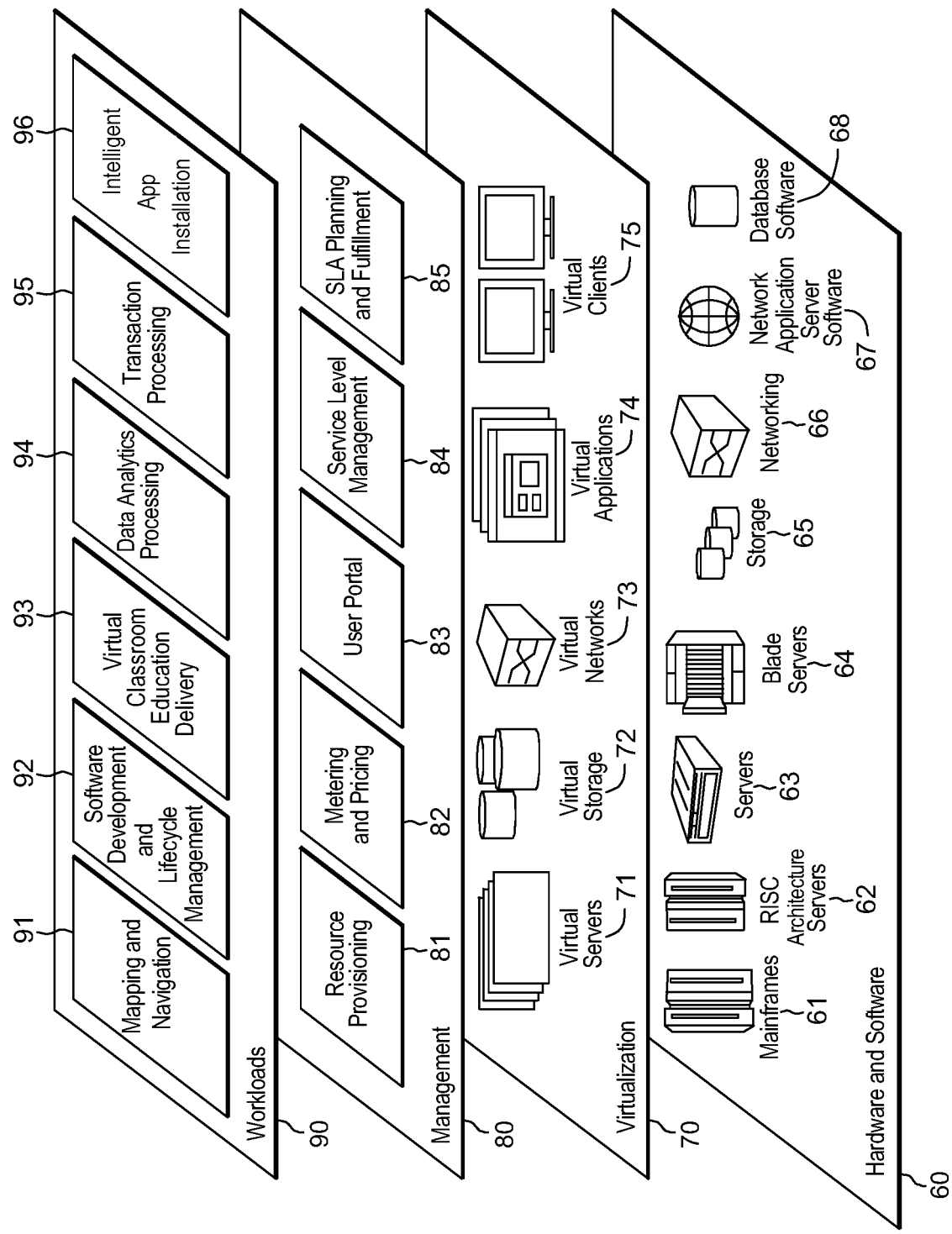
FIG. 7 depicts abstraction model layers according to an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and intelligent app installation 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:
   collecting device data of a mobile device of a user, the device data comprising information indicative of a location at which the user will be present at a future time;
   identifying, based on the collecting the device data, a software application associated with that location, the identifying comprising receiving from a remote system an identification of the software application based on a correlation between date or location information indicated by the device data and software application information from at least one mobile application source;
   downloading an installer for the software application to the mobile device of the user; and
   automatically installing the software application on the mobile device based on a triggering event, the installing being prior to arrival of the user at the location at the future time.

2. The method of claim 1, wherein the remote system is a remote cognitive analysis engine, and wherein the identifying further comprises:
   providing the collected device data to the remote cognitive analysis engine;
   invoking the remote cognitive analysis engine to cognitively analyze the device data; and
   receiving from the remote cognitive analysis engine the identification of the software application based on the remote cognitive analysis engine correlating the date or location information indicated by the device data and with the software application information.

3. The method of claim 2, wherein the device data comprises application data of at least one application installed on the mobile device of the user, the at least one application comprising one or more selected from a group consisting of: a messaging application, a social network application, an email application, and a calendar application of the mobile device.

4. The method of claim 2, wherein the identifying identifies the software application as being a resource that the user is expected to use at that location at the future time.

5. The method of claim 2, further comprising providing to the remote cognitive analysis engine utilization information about user engagement with the software application post-installation, to facilitate training the remote cognitive analysis system to identify useful applications for one or more users.

6. The method of claim 1, wherein the downloading the installer follows a prioritization of network connection type to use in downloading the installer, the prioritization emphasizing lower cost and faster networks relative to higher cost and slower networks.

7. The method of claim 6, wherein the downloading comprises delaying the downloading of the installer and awaiting connection of the mobile device to a Wi-Fi network.

8. The method of claim 7, wherein based on delaying the downloading of the installer to within a configurable timeframe of the future time and based on continuing to await connection of the mobile device to a Wi-Fi network, the downloading further comprises leveraging a next network connection type, other than a Wi-Fi network, to attempt the download.

9. The method of claim 1, wherein the triggering event comprises detecting that the mobile device is within a configurable distance from the location.

10. The method of claim 1, wherein the triggering event comprises determining that the mobile device is expected to arrive at the location within a configurable timeframe.

11. The method of claim 1, wherein the information of the device data is indicative, based on a cognitive analysis of the information, of the location at which the user will be present at the future time.

12. A computer program product comprising:
   a computer readable storage medium readable by a processing circuit and storing instructions for execution by the processing circuit for performing a method comprising:
   collecting device data of a mobile device of a user, the device data comprising information indicative of a location at which the user will be present at a future time;
   identifying, based on the collecting the device data, a software application associated with that location, the identifying comprising receiving from a remote system an identification of the software application based on a correlation between date or location information indicated by the device data and software application information from at least one mobile application source;
   downloading an installer for the software application to the mobile device of the user; and automatically installing the software application on the mobile device based on a triggering event, the installing being prior to arrival of the user at the location at the future time.

13. The computer program product of claim 12, wherein the remote system is a remote cognitive analysis engine, and wherein the identifying further comprises:
providing the collected device data to the remote cognitive analysis engine;
invoking the remote cognitive analysis engine to cognitively analyze the device data; and
receiving from the remote cognitive analysis engine the identification of the software application based on the remote cognitive analysis engine correlating the date or location information indicated by the device data and with the software application information.

14. The computer program product of claim 13, wherein the method further comprises providing to the remote cognitive analysis engine utilization information about user engagement with the software application post-installation, to facilitate training the remote cognitive analysis system to identify useful applications for one or more users.

15. The computer program product of claim 12, wherein the downloading the installer follows a prioritization of network connection type to use in downloading the installer, the prioritization emphasizing lower cost and faster networks relative to higher cost and slower networks, and wherein the downloading comprises delaying the downloading of the installer and awaiting connection of the mobile device to a Wi-Fi network.

16. The computer program product of claim 12, wherein the downloading the installer follows a prioritization of network connection type to use in downloading the installer, the prioritization emphasizing lower cost and faster networks relative to higher cost and slower networks, wherein the downloading comprises delaying the downloading of the installer and awaiting connection of the mobile device to a Wi-Fi network, and wherein based on delaying the downloading of the installer to within a configurable timeframe of the future time and based on continuing to await connection of the mobile device to a Wi-Fi network, the downloading further comprises leveraging a next network connection type, other than a Wi-Fi network, to attempt the download.

17. A computer system comprising:
a memory; and
a processor in communication with the memory, wherein the computer system is configured to perform a method comprising:
collecting device data of a mobile device of a user, the device data comprising information indicative of a location at which the user will be present at a future time;
identifying, based on the collecting the device data, a software application associated with that location, the identifying comprising receiving from a remote system an identification of the software application based on a correlation between date or location information indicated by the device data and software application information from at least one mobile application source;
downloading an installer for the software application to the mobile device of the user; and
automatically installing the software application on the mobile device based on a triggering event, the installing being prior to arrival of the user at the location at the future time.

18. The computer system of claim 17, wherein the remote system is a remote cognitive analysis engine, and wherein the identifying further comprises:
providing the collected device data to the remote cognitive analysis engine;
invoking the remote cognitive analysis engine to cognitively analyze the device data; and
receiving from the remote cognitive analysis engine the identification of the software application based on the remote cognitive analysis engine correlating the date or location information indicated by the device data with the software application information.

19. The computer system of claim 18, wherein the method further comprises providing to the remote cognitive analysis engine utilization information about user engagement with the software application post-installation, to facilitate training the remote cognitive analysis system to identify useful applications for one or more users.

20. The computer system of claim 17, wherein the downloading the installer follows a prioritization of network connection type to use in downloading the installer, the prioritization emphasizing lower cost and faster networks relative to higher cost and slower networks, and wherein the downloading comprises delaying the downloading of the installer and awaiting connection of the mobile device to a Wi-Fi network.

\* \* \* \* \*